United States Patent [19]

Komatsu

[11] Patent Number: 5,231,597
[45] Date of Patent: Jul. 27, 1993

[54] VEHICLE SPEED MEASURING METHOD AND APPARATUS

[75] Inventor: Toshio Komatsu, Shizuoka, Japan

[73] Assignee: Yazaki Corporation, Tokyo, Japan

[21] Appl. No.: 667,924

[22] Filed: Mar. 11, 1991

[30] Foreign Application Priority Data

Mar. 12, 1990 [JP] Japan .................................. 2-60679

[51] Int. Cl.⁵ .............................................. G01B 7/00
[52] U.S. Cl. .................................... 364/561; 324/160; 324/166; 377/24.1
[58] Field of Search ................ 324/160, 166; 364/561; 377/24.1

[56] References Cited

U.S. PATENT DOCUMENTS

| | | | |
|---|---|---|---|
| 4,074,196 | 2/1978 | Webster | 324/166 |
| 4,167,699 | 9/1979 | Baker | 324/166 |
| 4,506,312 | 3/1985 | Chan et al. | 364/565 X |
| 4,763,261 | 8/1988 | Imanaka et al. | 324/160 X |
| 4,922,447 | 5/1990 | Reichel | 377/19 X |
| 5,020,008 | 5/1991 | Chambers et al. | 377/30 X |

FOREIGN PATENT DOCUMENTS

3743958A1 7/1989 Fed. Rep. of Germany.

*Primary Examiner*—Edward R. Cosimano
*Attorney, Agent, or Firm*—Armstrong, Westerman, Hattori, McLeland & Naughton

[57] ABSTRACT

A vehicle speed measuring method and apparatus which can cope accurately with several vehicle speed sensors which produce different numbers of pulses for one rotation. Such vehicle speed sensors prepared for the method and apparatus produce predetermined different numbers of pulses for one rotation, some of such sensors defining a group wherein such numbers of pulses have a greatest common divisor greater than 1. It is first determined whether or not a particular vehicle speed sensor employed belongs to this group of sensors. When the sensor belongs to the group, pulses therefrom are frequency divided by a value obtained by division of the number of pulses produced for one rotation of the sensor by the greatest common divisor, and time data indicative of the time of appearance of a pulse by frequency division are stored into a memory for one rotation of the sensor. A period for one rotation of the sensor is calculated from such stored time data, and a vehicle speed is calculated from the period and a distance over which the vehicle runs for one rotation of the sensor.

15 Claims, 6 Drawing Sheets

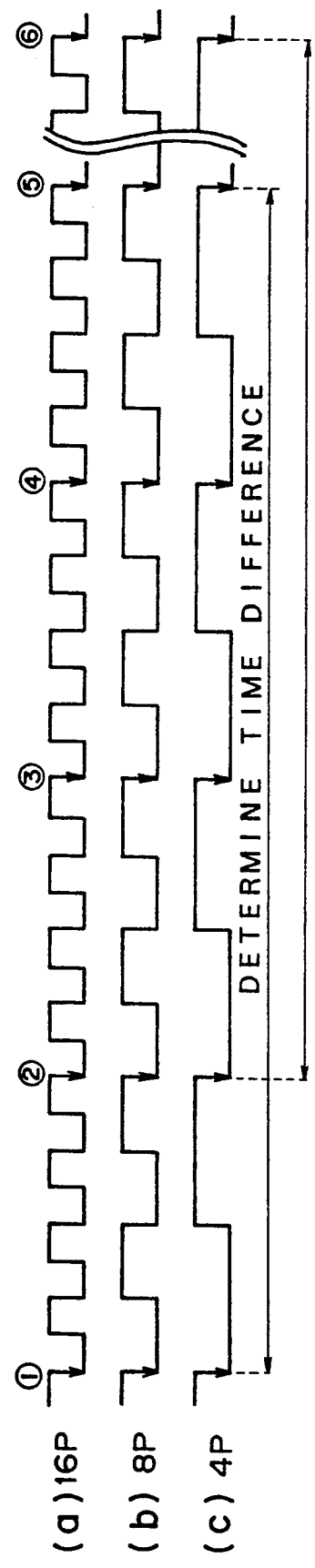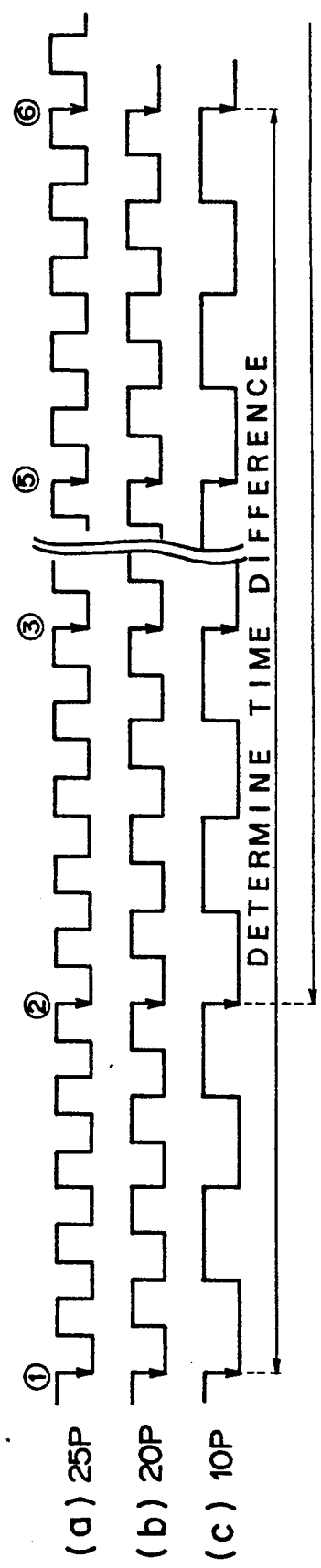

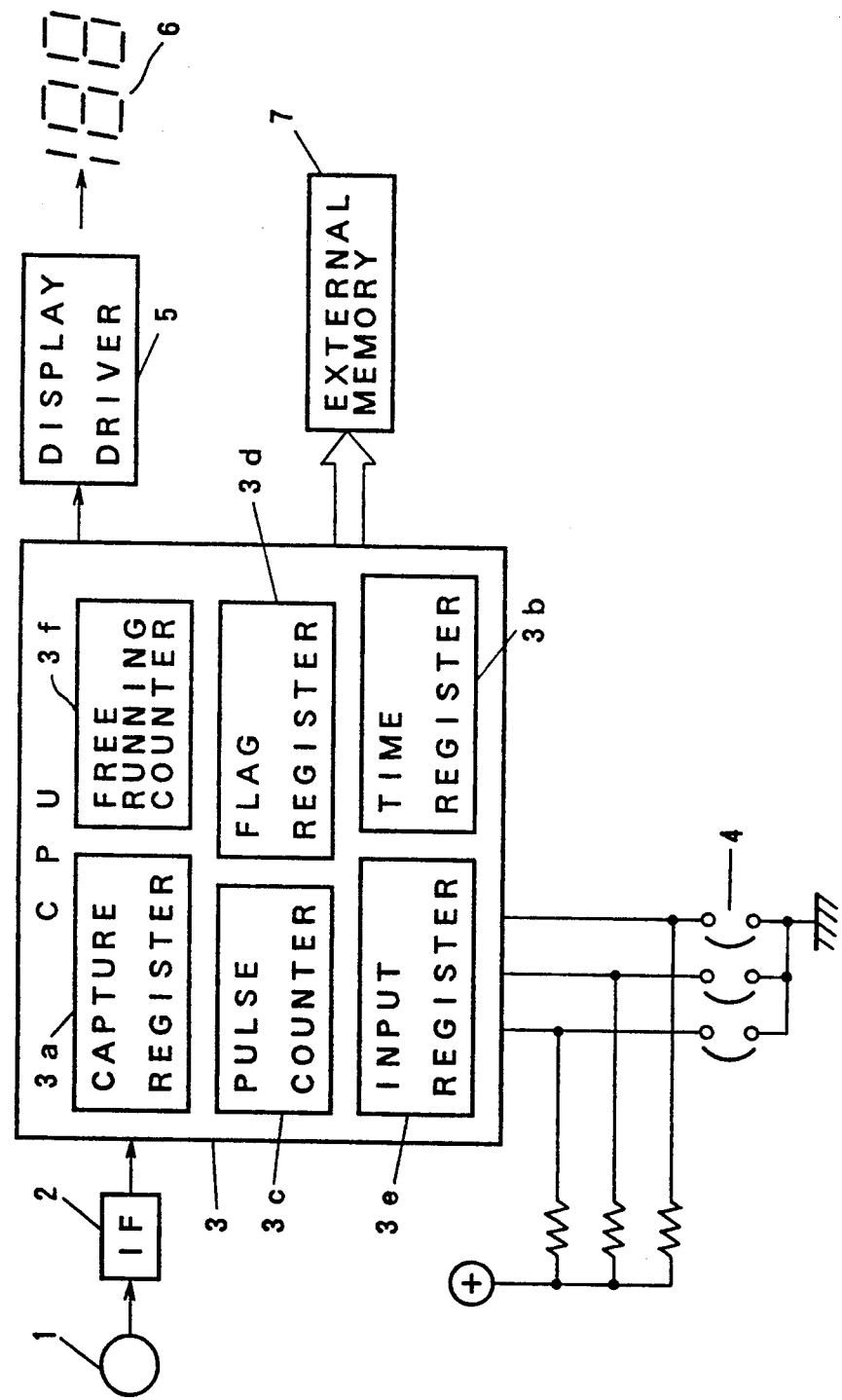

VEHICLE SPEED MEASURING METHOD AND APPARATUS

BACKGROUND OF THE INVENTION

1. Field of the Invention

This invention relates generally to a method of and apparatus for measuring a speed of a vehicle in accordance with pulses generated by a vehicle speed sensor which is rotated in response to a movement of the vehicle, and more particularly to a method and an apparatus which is prepared to employ any one of a plurality of different types of vehicle speed sensors which produce different numbers of pulses for one full rotation thereof.

2. Description of the Prior Art

Digital vehicle speed measuring apparatus are conventionally known which record data of a movement of a vehicle including, for example, vehicle speed information in the form of a digital signal into a record medium. An exemplary one of such conventional digital vehicle speed measuring apparatus is shown in FIG. 7. Referring to FIG. 7, the conventional digital vehicle speed measuring apparatus shown includes a vehicle speed sensor 1 which may produce 4, 8, 10, 16, 20 or 25 pulses for one full rotation thereof depending upon a type thereof. The digital vehicle speed measuring apparatus further includes an interface (IF) 2 which shapes pulses generated by the vehicle speed sensor 1, a microcomputer (CPU=central processing unit) 3 which operates in accordance with a predetermined control program, a setting device 4 for setting a type of the vehicle speed sensor 1 by way of a combination of presence or absence of jumper lines, a display driver 5 for causing a digital display unit 6 to display thereon a vehicle speed transmitted from the CPU 3 which measures such vehicle speed in accordance with pulses from the vehicle speed sensor 1 and a set value from the setting device 4, and an external memory 7 for storing therein digital data representative of a vehicle speed measured by the CPU 3.

With the conventional digital vehicle speed measuring apparatus of the construction described above, the CPU 3 determines the type of the vehicle speed sensor 1 from a set value received from the setting device 4, and where the vehicle speed sensor 1 connected is of a type which produces 4, 8 or 10 pulses for one full rotation, the CPU 3 measures a period of a pulse and calculates a vehicle speed by calculation. On the other hand, where the vehicle speed sensor 1 connected is of another type which produces 16, 20 or 25 pulses for one full rotation, the CPU 3 sets a gate time in accordance with such pulse number of the sensor and measures a number of pulses which is produced by the vehicle speed sensor 1 for such gate time, and then calculates a vehicle speed from the number of pulses thus measured.

In order to perform such operation, the CPU 3 executes such jobs as illustrated in a flow chart of FIG. 8. Referring to FIG. 8, the CPU 3 starts its operation when power is made available, and at first step S1 of the operation, the CPU 3 receives a set value from the setting device 4. Then at step S2, the set value thus received is checked to judge whether or not the vehicle speed sensor 1 is of a type which produces 4, 8 or 10 pulses for one rotation. If the judgment is YES and the vehicle speed sensor 1 connected is of the type which produces 4, 8 or 10 pulses for one rotation, then a flag is set to "1" at step S3, but on the contrary if the judgment at step S2 is NO and the vehicle speed sensor 1 connected is of another type which produces 16, 20 or 25 pulses for one rotation, the flag is set to "0" at step S4, and then a gate time is set at step S5 in accordance with the type of the vehicle speed sensor 1 connected. After execution of the job at either of the steps S3 and S5, the control sequence advances to step S6 at which it is judged whether or not the flag is equal to "1".

If the judgment at step S6 is YES, then the control sequence advances to step S7 at which the CPU 3 waits a pulse to be received from the vehicle speed sensor 1 by way of the interface 2. After a pulse is received and the judgment at step S7 changes to YES, the control sequence advances to step S8 at which the count value of a free running counter which is constructed in the CPU 3 and incremented after lapse of each fixed interval of time by a clock of a fixed period is set as a capture value to a capture register also constructed in the CPU 3, whereafter the control sequence advances to step S9. At step S9, it is judged from the set value received at step S1 and representative of a type of the vehicle speed sensor 1 whether or not the vehicle speed sensor 1 is of the type which produces 4 pulses for one rotation. In case the judgment at step S9 is YES, the control sequence advances to step S10.

At step S10, contents of second to fifth ones $T_2$ to $T_5$ of eleven time registers $T_1$ to $T_{11}$ constructed in the CPU 3 are transferred to the first to fourth time registers $T_1$ to $T_4$, respectively, and at subsequent step S11, the capture value placed into the capture register at step S8 is transferred to the fifth time register $T_5$. After then, the control sequence advances to step S12 at which a difference between contents of the first time register $T_1$ and contents of the fifth time register $T_5$, that is, $T=T_5-T_1$, is taken to calculate a period T for one rotation of the vehicle speed sensor 1. After such calculation of a period T for one rotation of the vehicle speed sensor 1 at step S12, the control sequence advances to step S13 at which a vehicle speed is calculated by dividing a travel distance A of the vehicle for one rotation of the vehicle speed sensor 1 by the period T. Data calculated in this manner and indicative of a vehicle speed are inputted to the display driver (step S51), and consequently, such vehicle speed is displayed on the display unit 6. In addition, the data are also outputted to the external memory (step S52) so that they may be stored into the external memory 7.

In case the judgment at step S9 is NO, the control sequence advances to step S14 at which it is judged whether or not the vehicle speed sensor 1 is of the type which produces 8 pulses for one rotation. If the judgement is YES, then a period T is calculated at steps S15 to S17 in accordance with a similar algorism to that at steps S10 to S12 described hereinabove. After then, a vehicle speed is calculated at step S13 making use of the period T calculated in this manner. On the contrary if the judgment at step S14 is NO, it is determined that the vehicle speed sensor is of the type which produces 10 pulses for one rotation, and a period T is calculated subsequently at steps S18 to S20 in accordance with a similar algorism. After then, a vehicle speed is calculated at step S13 making use of the period T calculated in this manner.

On the other hand, in case the judgment at step S6 is NO and the vehicle speed sensor 1 connected is of any type which produces a number of pulses other than 4, 8 and 10 pulses for one rotation, the control sequence advances to step S21 at which the CPU 3 waits a pulse to be received from the vehicle speed sensor 1 by way of the interface 2. After a pulse is received and the judgment at step S21 changes to YES, the control sequence advances to step S22 at which a pulse counter constructed in the CPU 3 is incremented. After then, at step S23, it is judged whether or not the gate time set at step S5 has elapsed, and if the gate time has not yet elapsed, the control sequence returns to step S21 to repeat the jobs at step S21 and so forth. On the other hand, if the gate time has elapsed and the judgment at step S23 is YES, then the control sequence advances to step S24 at which a vehicle speed is calculated making use of the gate time, the count value of the pulse counter and so forth. Then at step S25, the count value of the pulse counter is cleared, whereafter the control sequence returns to step S21.

As described above, in the conventional digital vehicle speed measuring apparatus, where a vehicle speed sensor which produces 4, 8 or 10 pulses for one rotation is employed, a time necessary for the vehicle speed sensor to make one rotation, that is, a period, is measured, and then a vehicle speed is found out by calculation in accordance with the measured thus calculated. On the other hand, where another vehicle speed sensor which produces 16, 20 or 25 pulses for one rotation is employed, a number of pulses produced by the vehicle speed sensor for a gate time set in accordance with the type of the vehicle speed sensor is counted, and a vehicle speed is found out by calculation in accordance with the gate time, count value and so forth.

Consequently, since means for calculating a vehicle speed must be provided separately for different types of vehicle speed sensors as described hereinabove with reference to the flow chart of FIG. 8 and such calculating means cannot be used commonly for such different vehicle speed sensors, the conventional digital vehicle speed measuring apparatus is complicated in construction. Where a CPU which operates in accordance with a control program is employed as in the case of the conventional digital vehicle speed measuring apparatus described above, the control program involves a great number of steps for such calculation and a ROM (read only memory) for storing the control program therein must have a corresponding great storage capacity. Also, a RAM (random access memory) which is used as a working area must have a corresponding great storage capacity.

Further, since the gate time system is employed, where a high degree of accuracy of, for example, 0.1 km/h is required, the gate time is excessively long, and consequently, the responsibility is low. As a result, the digital vehicle speed measuring apparatus cannot be employed where such high accuracy is required.

SUMMARY OF THE INVENTION

It is an object of the present invention to provide a vehicle speed measuring method which can cope with a high degree of accuracy with several vehicle speed sensors which produce different numbers of pulses for one rotation.

It is another object of the present invention to provide a vehicle speed measuring apparatus of a simple construction which can cope with a high degree of accuracy with several vehicle speed sensors which produce different numbers of pulses for one rotation.

In order to attain the objects, according to one aspect of the present invention, there is provided a method of measuring a speed of a vehicle using a vehicle speed sensor which is connected to be rotated by the vehicle upon running of the vehicle to produce, for one rotation thereof, a number of pulses which is any one of several predetermined different numbers peculiar to available vehicle speed sensors which are prepared for the vehicle speed measuring method and some of which make a group wherein the numbers of pulses to be produced for one rotation have a greatest common divisor greater than 1, comprising the steps of discriminating whether or not the vehicle speed sensor connected to the vehicle belongs to the group, frequency dividing, when the vehicle speed sensor belongs to the group, pulses from the vehicle speed sensor by a value obtained by division of a number of pulses produced for one rotation of the vehicle speed sensor by the greatest common divisor, storing, each time a pulse obtained by such frequency division appears, time data indicative of the time of appearance of such pulse for at least one rotation of the vehicle speed sensor, calculating, for each of the time data thus stored, a period for one rotation of the vehicle speed sensor in accordance with such time data and preceding time data which were stored when a pulse obtained by frequency division appeared precedently to the pulse by a number of pulse distances equal to the greatest common divisor, and calculating a speed of the vehicle in accordance with the period for one rotation of the vehicle speed sensor and a distance over which the vehicle runs for one rotation of the vehicle speed sensor.

Where the available vehicle speed sensors make two groups wherein the numbers of pulses to be produced for one rotation have greatest common divisors which are greater than 1 and different between the two groups, the vehicle speed measuring method is modified such that it is first discriminated to which one of the two groups the vehicle speed sensor connected to the vehicle belongs, and then pulses from the vehicle speed sensor are by a value obtained by division of a number of pulses produced for one rotation of the vehicle speed sensor by the greatest common divisor of the one group to which the vehicle speed sensor belongs, whereafter a speed of the vehicle is calculated in a similar manner.

With the vehicle speed measuring method, it is first discriminated whether or not the vehicle speed sensor employed belongs to the group or to which one of the two groups the vehicle speed sensor belongs, and when the vehicle speed sensor either belongs to the group or one of the two groups, pulses from the vehicle speed sensor are frequency divided by a value obtained by division of a number of pulses produced for one rotation of the vehicle speed sensor by the greatest common divisor of the group to which the vehicle sensor belongs. Accordingly, whichever one of vehicle speed sensors belonging to the group is employed as such vehicle speed sensor, the number of such pulses after the frequency division is equal among those vehicle speed sensors. Consequently, a procedure for the calculation of a vehicle speed can be made common among those vehicle speed sensors. Accordingly, the vehicle speed measuring method need not adopt the gate time system in order to attain such common procedure. Or otherwise, the vehicle speed measuring method can cope with a high degree of accuracy with a greater number of different vehicle speed sensors.

According to another aspect of the present invention, there is provided an apparatus for measuring a speed of a vehicle using a vehicle speed sensor which is connected to be rotated by the vehicle upon running of the vehicle to produce, for one rotation thereof, a number of pulses which is any one of several predetermined different numbers peculiar to available vehicle speed sensors which are prepared for the vehicle speed measuring apparatus and some of which make a group wherein the numbers of pulses to be produced for one rotation have a greatest common divisor greater than 1, comprising discriminating means for discriminating whether or not the vehicle speed sensor connected to the vehicle belongs to the group, setting means for dividing, when the vehicle speed sensor belongs to the group, a number of pulses produced for one rotation of the vehicle speed sensor by the greatest common divisor to set a frequency dividing ratio, frequency dividing means for frequency dividing, when the vehicle speed sensor belongs to the group, pulses from the vehicle speed sensor by the frequency dividing ratio set by the setting means, storage means for storing, each time a pulse obtained by frequency division of the frequency dividing means appears, time data indicative of the time of appearance of such pulse for at least one rotation of the vehicle speed sensor, period calculating means for calculating a period for one rotation of the vehicle speed sensor in accordance with time data stored in the storage means, and vehicle speed calculating means for calculating a speed of the vehicle in accordance with the period calculated by the period calculating means and a distance over which the vehicle runs for one rotation of the vehicle speed sensor.

Where the available vehicle speed sensors make two groups wherein the numbers of pulses to be produced for one rotation have greatest common divisors which are greater than 1 and different between the two groups, the vehicle speed measuring method is modified such that discriminating means discriminates to which one of the two groups the vehicle speed sensor connected to the vehicle belongs, and the setting means divides a number of pulses produced for one rotation of the vehicle speed sensor by the greatest common divisor of the one group to which the vehicle speed sensor belongs to set a frequency dividing ratio.

With the vehicle speed measuring apparatus, where the vehicle speed sensor belongs to the group or one of the two groups, a value obtained by dividing a number of pulses produced for one rotation of the vehicle speed sensor by the greatest common divisor of the group to which the vehicle speed sensor belongs is set by the setting means as a frequency dividing ratio of the frequency dividing means, and pulses produced from the vehicle speed sensor are frequency divided by the thus set frequency dividing ratio. Accordingly, whichever one of vehicle speed sensors belonging to the group is employed as the vehicle speed sensor, the number of such pulses after the frequency division can be made equal among those vehicle speed sensors. Consequently, a procedure for the calculation of a vehicle speed can be performed commonly among those vehicle speed sensors. Besides, since time data required to be stored into the storage means are reduced in amount by frequency division and consequently the storage capacity of the storage means can be reduced, the vehicle speed measuring apparatus need not adopt the gate time system in order to attain such common procedure. Or otherwise, the vehicle speed measuring apparatus can cope with a high degree of accuracy with a greater number of different vehicle speed sensors.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2 and 3 are timing diagrams illustrating a vehicle speed measuring method according to the present invention;

FIG. 4 is a block diagram of a vehicle speed measuring apparatus showing a preferred embodiment of the present invention;

DESCRIPTION OF THE PREFERRED EMBODIMENT

Figure 1:
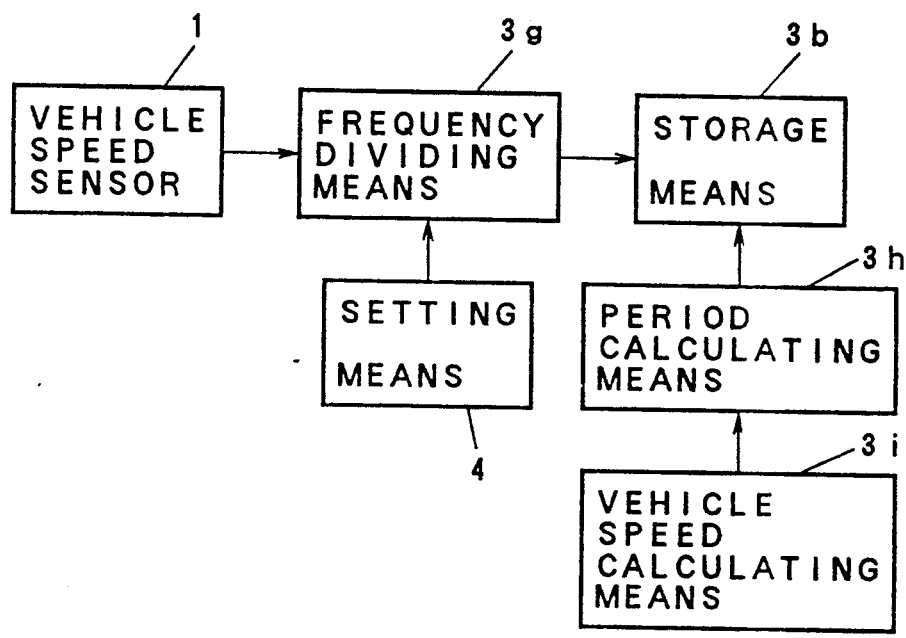
FIG. 1 is a block diagram illustrating basic construction of a vehicle speed measuring apparatus according to the present invention.

According to a vehicle speed measuring method of the present invention, a speed of a vehicle is measured in accordance with pulses produced from a vehicle speed sensor which is rotated in response to rotation of a wheel of the vehicle to produce, for one rotation, a number of pulses which is any one of several predetermined different numbers peculiar to available vehicle speed sensors which are prepared for the measuring method and either some of which make a group wherein the numbers of pulses to be produced for one rotation have a greatest common divisor greater than 1 or which make two groups wherein such numbers of pulses have greatest common divisors which are greater than 1 and different between the two groups. In measurement, it is first discriminated either whether or not the vehicle speed sensor connected to the wheel of the vehicle belongs to the group or to which one of the two groups the vehicle speed sensor belongs, and when the vehicle speed sensor either belongs to the group or one of the two groups, pulses from the vehicle speed sensor are frequency divided by a value obtained by division of a number of pulses produced for one rotation of the vehicle speed sensor by the greatest common divisor of the group to which the vehicle speed sensor belongs. Then, each time a pulse obtained by such frequency division appears, time data indicative of the time of appearance of such pulse are stored for at least one rotation of the vehicle speed sensor, and then, for each of the time data thus stored, a period for one rotation of the vehicle speed sensor is calculated in accordance with such time data and preceding time data which were stored when a pulse obtained by frequency division appeared precedently to the pulse by a number of pulse distances equal to the greatest common divisor. Finally, a speed of the vehicle is calculated in accordance with the period for one rotation of the vehicle speed sensor and a distance over which the vehicle runs for one rotation of the vehicle speed sensor.

The vehicle speed measuring method is prepared to employ any one of vehicle speed sensors of different types which produce predetermined different numbers of pulses for one rotation and some of which make a group wherein the numbers of pulses to be produced for one rotation have a greatest common divisor greater than 1 or which make two groups wherein such numbers of pulses have greatest common divisors which are greater than 1 and different between the two groups. Thus, with the vehicle speed measuring method, it is first discriminated whether or not the vehicle speed sensor employed belongs to the group or to which one of the two groups the vehicle speed sensor belongs, and when the vehicle speed sensor either belongs to the group or one of the two groups, pulses from the vehicle speed sensor are frequency divided by a value obtained by division of a number of pulses produced for one rotation of the vehicle speed sensor by the greatest common divisor of the group to which the vehicle sensor belongs. Accordingly, whichever one of vehicle speed sensors belonging to the group is employed as such vehicle speed sensor, the number of such pulses after the frequency division is equal among those vehicle speed sensors. Consequently, a procedure for the calculation of a vehicle speed is made common among those vehicle speed sensors. In particular, each time a pulse obtained by such frequency division appears, time data indicative of the time of appearance of such pulse are stored for at least one rotation of the vehicle speed sensor, and then, for each of the time data thus stored, a period for one rotation of the vehicle speed sensor is calculated in accordance with such time data and preceding time data which were stored when a pulse obtained by frequency division appeared precedently to the pulse by a number of pulse distances equal to the greatest common divisor. Finally, a speed of the vehicle is calculated in accordance with the period for one rotation of the vehicle speed sensor and a distance over which the vehicle runs for one rotation of the vehicle speed sensor. Thus, the procedure including the storing operation, period calculation and vehicle speed calculation is common to such vehicle speed sensors belonging to the group. Accordingly, the vehicle speed measuring method need not adopt the gate time system in order to attain such common procedure. Or otherwise, the vehicle speed measuring method can cope with a high degree of accuracy with a greater number of different vehicle speed sensors.

The vehicle speed measuring method will be described in more detail with reference to FIGS. 2 and 3. Curves (a) to (c) of FIG. 2 show output waveforms of different vehicle speed sensors which produce 16, 8 and 4 pulses for one rotation, respectively, when the vehicle is running at an arbitrary same speed. Since the greatest common divisor of 16, 8 and 4 is 4, a same period calculation as in the case of a vehicle speed sensor which produces 4 pulses for one rotation (that is, a 4 P vehicle speed sensor) can be performed, for another vehicle speed sensor which produces 16 pulses for one rotation (a 16 P vehicle speed sensor), by ¼ frequency division of an output of such 16 P vehicle speed sensor and, also for a further vehicle speed sensor which produces 8 pulses for one rotation (an 8 P vehicle speed sensor), by ½ frequency division of an output of such 8 P vehicle speed sensor. In particular, in the case of a 4 P vehicle speed sensor, a period for one rotation of the 4 P vehicle speed sensor can be determined by detecting, for each pulse, a relative time at the point of time of a falling edge of the pulse and taking a difference of such relative time from a relative time detected four pulse intervals before. Meanwhile, a relative time at the point of time of a falling edge of a pulse is detected, in the case of an 8 P vehicle speed sensor, for each two pulses, but in the case of a 16 P vehicle speed sensor, for each four pulses, and similar processing to that of the case of a 4 P vehicle speed sensor is performed to determine a period for one rotation.

More particularly, data of a timer in the form of a free running counter which operates in response to a clock of a fixed period are read in at each of falling edges of pulses indicated by arrow marks in FIG. 2, and latest five ones of the thus read data are stored as relative times into five time registers. Then, at each of such falling edges, a difference of latest data from data detected four pulse intervals before is taken to determine a period for one rotation of any of vehicle speed sensors.

On the other hand, curves (a) to (c) of FIG. 3 show output waveforms of vehicle speed sensors which produce 25, 20 and 10 pulses for one rotation, respectively, when the vehicle is driving at an arbitrary same speed. Since the greatest common divisor of 25, 20 and 10 is 5, a same period calculation as in the case of a vehicle speed sensor which produces 5 pulses for one rotation (a 5 P vehicle speed sensor) can be performed, for another vehicle speed sensor which produces 25 pulses for one rotation (a 25 P vehicle speed sensor), by 1/5 frequency division of an output of such 25 P vehicle speed sensor, and for a further vehicle speed sensor which produces 20 pulses for one rotation (a 20 P vehicle speed sensor), by ¼ frequency division of an output of such 20 P vehicle speed sensor, and further for a still further vehicle speed sensor which produces 10 pulses for one rotation (a 10 P vehicle speed sensor), by ½ frequency division of an output of such 10 P vehicle speed sensor. In particular, in the case of a 10 P vehicle speed sensor, a period for one rotation thereof can be determined by detecting, for each two pulses, a relative time at the point of time of a falling edge of the pulse and taking a difference of such relative time from a relative time detected five pulse intervals before. Meanwhile, a relative time at the point of time of a falling edge of a pulse is detected, in the case of a 20 P vehicle speed sensor, for each four pulses, but in the case of a 25 P vehicle speed sensor, for each five pulses, and similar processing to that of the case of a 10 P vehicle speed sensor is performed to determine a period for one rotation.

More particularly, data of a timer in the form of a free running counter which operates in response to a clock of a fixed period are read in at each of falling edges of pulses indicated by arrow marks in FIG. 3, and latest six ones of the thus read data are stored as relative times into six time registers. Then, at each of such falling edges, a difference of latest data from data detected five pulse intervals before is taken to determine a period of one rotation of any of such different vehicle speed sensors.

The vehicle speed measuring method described above is put into practical use with a vehicle speed measuring apparatus having such basic construction as shown in FIG. 1. Referring to FIG. 1, the vehicle speed measuring apparatus according to the present invention includes a vehicle speed sensor 1 which is rotated in response to rotation of a wheel not shown of a vehicle not shown, in which the vehicle speed measuring apparatus is incorporated, during driving of the vehicle to produce, for one rotation, a number of pulses which is any one of several predetermined different numbers peculiar to available vehicle speed sensors which are prepared for the measuring method and either some of which make a group wherein the numbers of pulses to be produced for one rotation have a greatest common divisor greater than 1 or which make two groups wherein such numbers of pulses have greatest common divisors which are greater than 1 and different between the two groups. The vehicle speed measuring apparatus further includes frequency dividing means $3g$ for frequency dividing pulses produced by the vehicle speed sensor 1, setting means 4 for setting a frequency dividing ratio of the frequency dividing means $3g$, storage means $3b$ for storing therein, each time a pulse appears as a result of frequency division by the frequency dividing means $3g$, time data representative of the time of such appearance for a period of time for at least one rotation of the vehicle speed sensor 1, period calculating means $3h$ for calculating a period of the vehicle speed sensor 1 for one rotation in accordance with the time data stored in the storage means $3b$, and vehicle speed calculating means $3i$ for calculating a vehicle speed in accordance with the period calculated by the period calculating means $3h$ and a travel distance of the vehicle for one rotation of the vehicle speed sensor 1. The frequency dividing ratio to be set by the setting means 4 is determined by dividing, when the vehicle speed sensor 1 belongs to the group or one of the two groups, a number of pulses produced for one rotation of the vehicle speed sensor 1 by the greatest common divisor of the group to which the vehicle speed sensor 1 belongs.

The vehicle speed measuring apparatus is prepared to employ any one of vehicle speed sensors of different types which produce predetermined different numbers of pulses for one rotation and either some of which make a group wherein the numbers of pulses to be produced for one rotation have a greatest common divisor greater than 1 or which make two groups wherein such numbers of pulses have greatest common divisors which are greater than 1 and different between the two groups. Thus, with the vehicle speed measuring apparatus, where the vehicle speed sensor 1 belongs to the group or one of the two groups, a value obtained by dividing a number of pulses produced for one rotation of the vehicle speed sensor 1 by the greatest common divisor of the group to which the vehicle speed sensor 1 belongs is set by the setting means 4 as a frequency dividing ratio of the frequency dividing means $3g$, and pulses produced from the vehicle speed sensor are frequency divided by the thus set frequency dividing ratio. Accordingly, whichever one of vehicle speed sensors belonging to the group is employed as the vehicle speed sensor 1, the number of such pulses after the frequency division is equal among those vehicle speed sensors. Consequently, a procedure for the calculation of a vehicle speed can be performed commonly among those vehicle speed sensors. In particular, each time a pulse obtained by such frequency division appears, time data indicative of the time of appearance of such pulse are stored for at least one rotation of the vehicle speed sensor 1 into the storage means $3b$, and, for each of the time data thus stored in the storage means $3b$, a period for one rotation of the vehicle speed sensor 1 is calculated by the period calculating means $3h$ in accordance with such time data stored in the storage means $3b$. Then, a speed of the vehicle is calculated by the vehicle speed calculating means $3i$ in accordance with the period calculated by the period calculating means $3h$ and a distance over which the vehicle runs for one rotation of the vehicle speed sensor 1. Thus, the procedure for the calculation of a vehicle speed can be performed commonly by the storage means $3b$, period calculating means $3h$ and vehicle speed calculating means 3.

With the vehicle speed measuring apparatus, since means for calculating a vehicle speed in accordance with a period for one rotation is made common to vehicle speed sensors which can be incorporated in the vehicle speed measuring apparatus and have a greatest common divisor or divisors greater than 1 among numbers of pulses to be produced for one rotation and besides time data required to be stored into the storage means are reduced in amount by frequency division and consequently the storage capacity of the storage means can be reduced, the vehicle speed measuring apparatus need not adopt the gate time system in order to attain such common procedure. Or otherwise, the vehicle speed measuring apparatus can cope with a high degree of accuracy with a greater number of different vehicle speed sensors.

Figure 7:
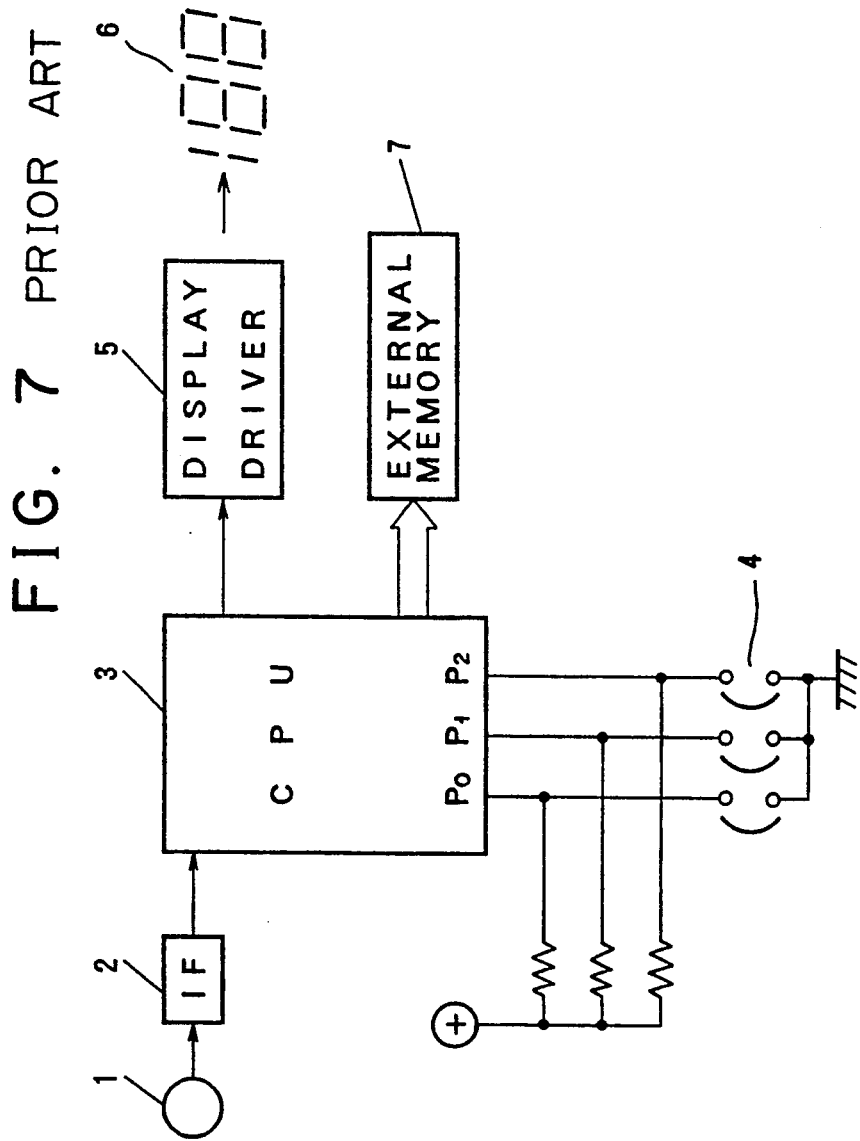
FIG. 7 is a block diagram showing a conventional digital vehicle speed measuring apparatus.
Figure 8:
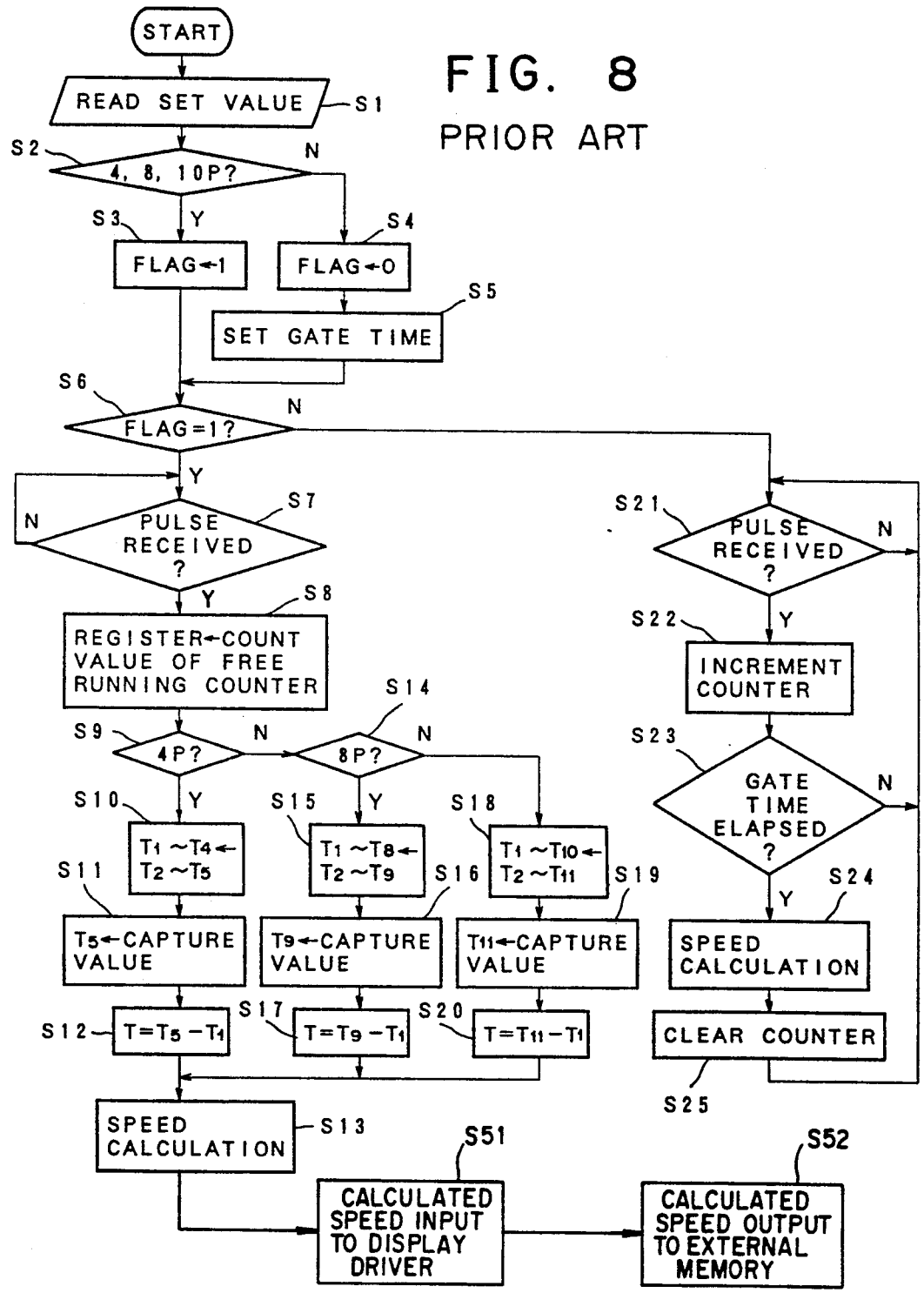
FIG. 8 is a flow chart illustrating operation of the digital speed measuring apparatus of FIG. 7.

Referring now to FIG. 4, there is shown a vehicle speed measuring apparatus on which the vehicle speed measuring apparatus described above is worked in accordance with the present invention. The vehicle speed measuring apparatus has a generally similar construction to the conventional measuring apparatus described hereinabove with reference to FIG. 7 and includes a vehicle speed sensor 1 which may produce 4, 8, 10, 16, 20 or 25 pulses for one full rotation thereof depending upon a type thereof. The digital vehicle speed measuring apparatus further includes an interface 2 which shapes pulses generated by the vehicle speed sensor 1, a microcomputer or CPU which operates in accordance with a predetermined control program, a setting device 4 for setting a type of the vehicle speed sensor 1 by way of a combination of presence or absence of jumper lines, a display driver 5 for causing a digital display unit 6 to display thereon a vehicle speed transmitted from the CPU 3 which measures such vehicle speed in accordance with pulses from the vehicle speed sensor 1 and a set value from the setting device 4, and an external memory 7 for storing therein digital data representative of a vehicle speed measured by the CPU 3.

Figure 5:
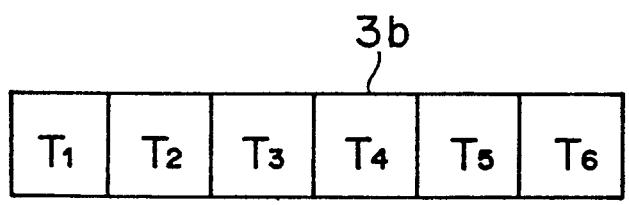
FIG. 5 is a block diagram illustrating details of a time register of the vehicle speed measuring apparatus of FIG. 4.

The CPU 3 includes a capture register $3a$, a time register $3b$, a pulse counter $3c$, a flag register $3d$, an input register $3e$ and a free running register $3f$ constructed therein making use of a predetermined area of a RAM (not shown) therein. The time register $3b$ particularly consists of 6 registers $T_1$ to $T_6$ as seen in FIG. 5. Meanwhile, the free running counter $3f$ counts a pulse of a predetermined short period generated by a pulse generator not shown to produce data indicative of a relative time on the order of 1/100 second.

Figure 6:
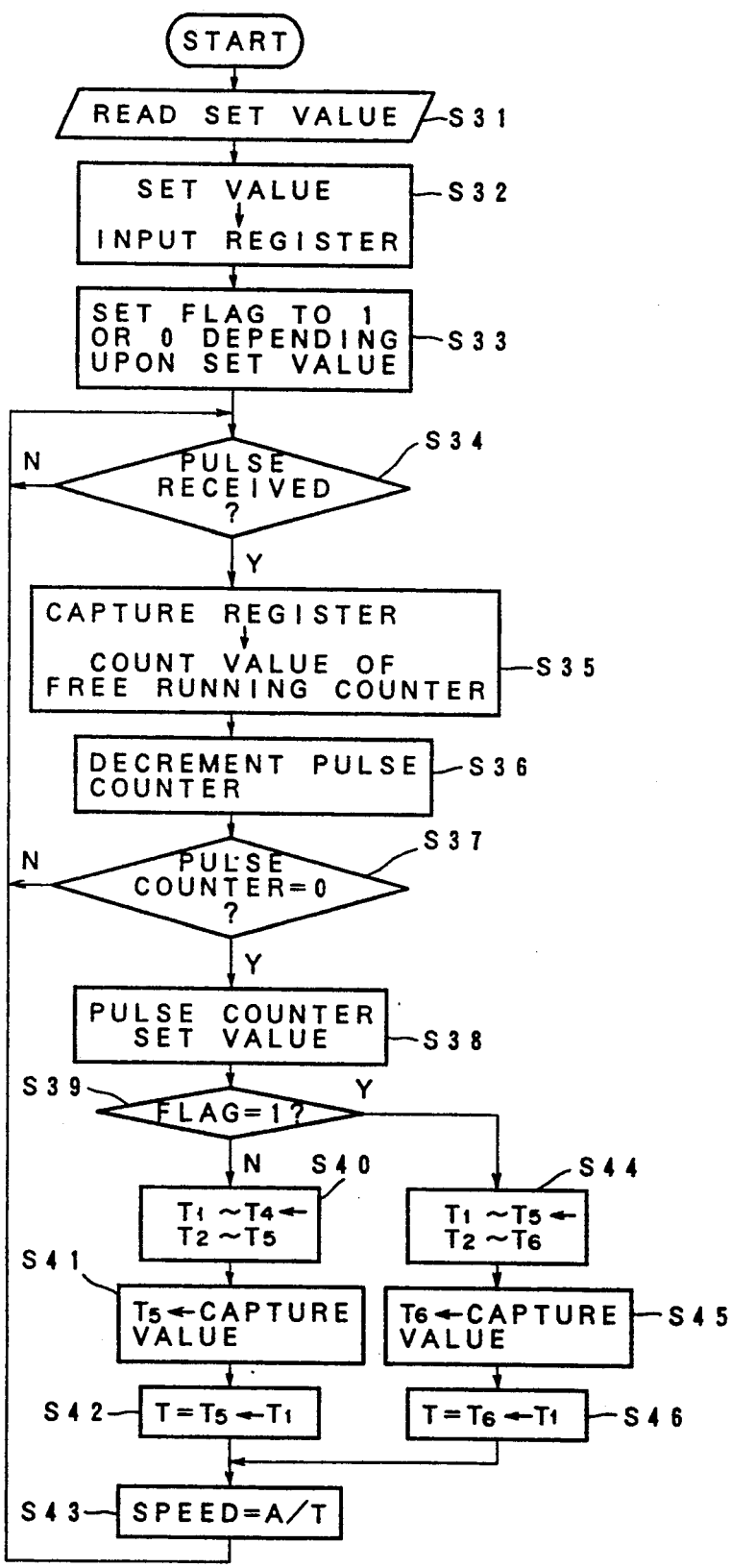
FIG. 6 is a flow chart illustrating operation of the vehicle speed measuring apparatus of FIG. 4.

Operation of the vehicle speed measuring apparatus having such construction as described above will be described subsequently with reference to the flow chart of FIG. 6. After power is made available, the CPU 3 of the vehicle speed measuring apparatus starts its operation and first receives, at step S31, a set value set by the setting device 4. The value set by the setting device 4 is represented in a binary number and is "1" in the case of a 4 P vehicle speed sensor, "2" in the case of an 8 or 10 P vehicle speed sensor, "4" in the case of a 16 or 20 P vehicle speed sensor, and "5" in the case of a 25 P vehicle speed sensor. The control sequence of the CPU 3 subsequently advances to step S32 at which the set value read in at step S31 is stored into the pulse counter $3c$ and the input register $3e$. Then at step S33, a flag is set to "1" or "0" in the flag register $3d$ in accordance with a type of the vehicle speed sensor 1. The flag is set to "1" where the vehicle speed sensor 1 is a 4, 8 or 16 P vehicle speed sensor but to "0" where the vehicle speed sensor 1 is a 10, 20 or 25 P vehicle speed sensor.

After then, the control sequence advances to step S34 at which the CPU 3 waits until a pulse is received from the vehicle speed sensor 1 by way of the interface 2. A pulse is received upon detection, for example, of a falling edge of such pulse, and if it is judged at step S34 that a pulse is received, then the control sequence advances to step S35 at which a current count value of the free running counter $3f$ is stored into the capture register $3a$ and then to step S36 at which the pulse counter $3c$ is decremented by one. After then, at step S37, it is judged whether or not the count value of the pulse counter $3c$ then is equal to 0, and if the judgment is NO, the control sequence returns to step S34 to wait reception of a next pulse.

Where a 4 P vehicle speed sensor is employed as the vehicle speed sensor 1, the value "1" is set by the setting device 4 as described hereinabove, and accordingly, the value "1" is stored into the pulse counter $3c$ at step S32. Consequently, each time a pulse is received, the judgment at step S37 proves YES. On the other hand, where one of the values from 2 to 5 is set as the set value in accordance with the type of a vehicle speed sensor employed, the count value of the pulse counter $3c$ is not reduced to zero by reception of a single pulse but is reduced to zero each time two to five pulses are received. Thus, frequency dividing means for frequency dividing pulses produced by the vehicle speed sensor 1 using the set value set by the setting device 4 is constituted from the jobs at steps S34, S35 and S37 described above.

If the judgment at step S37 is YES, then the control sequence advances to step S38 at which the set value stored in the input register $3e$ is written into the pulse counter $3c$, and then to step S39 at which it is judged whether or not the flag is equal to 1.

Now, if a 4, 8 or 16 P vehicle speed sensor is employed as the vehicle speed sensor 1, then the judgment at step S39 is NO, and the control sequence advances to step S40. At step S40, contents of the second to fifth registers $T_2$ to $T_5$ of the time register $3b$ are written into the first to fourth registers $T_1$ to $T_4$, respectively, and then at step S41, the count value which has been stored into the capture register $3a$ at step S35 is written into the fifth register $T_5$ of the time register $3b$. After then, the control sequence advances to step S42 at which a difference of the contents of the fifth register $T_5$ from the contents of the first register $T_1$ is taken to find out a period T for one rotation of the vehicle speed sensor 1. The period thus found out at step S42 is used to find out a vehicle speed by calculation at step S43. In such calculation at step S43, a constant A which corresponds to a distance over which the vehicle runs for one rotation of the vehicle speed sensor 1 and is provided by a product between a rotational speed ratio $\alpha$ between a tire of the vehicle and the vehicle speed sensor 1 and a circumferential length of the tire is divided by the period T. After execution of the job at step S43, the control sequence returns to step S34 to repeat such a sequence of operations as described above.

On the other hand, where a 10, 20 or 25 P vehicle speed sensor is employed as the vehicle speed sensor 1, the judgment at step S39 is YES, and the control sequence advances to step S44. At step S44, contents of the second to sixth registers $T_2$ to $T_6$ of the time register $3b$ are written into the first to fifth registers $T_1$ to $T_5$, respectively, and then at step S45, the count value which has been stored into the capture register $3a$ at step S35 is written as a capture value into the sixth register $T_6$ of the time register $3b$. After then, the control sequence advances to step S46 at which a difference between contents of the sixth register $T_6$ and the first register $T_1$ is taken to find out a period T for one rotation of the vehicle speed sensor 1. The period T thus found out at step S46 is used to determine a vehicle speed by calculation at subsequent step S43. After execution of the job at step S43, the control sequence returns to step S34 to repeat such a sequence of operations as described above.

With the vehicle speed measuring apparatus of the embodiment of the present invention described above, since the six vehicle speed sensors are processed commonly in two procedures for a 4 P vehicle speed sensor and a 5 P vehicle speed sensor, the storage capacity of the ROM can be reduced due to reduction in number of program steps and also the storage capacity of the memory in the CPU can be reduced. Further, since such common procedures can eliminate the necessity of employment of the gate time system, improvement in accuracy can be achieved readily.

Having now fully described the invention, it will be apparent to one of ordinary skill in the art that many changes and modifications can be made thereto without departing from the spirit and scope of the invention as set forth herein.

What is claimed is:

1. A method of measuring a speed of a vehicle using a vehicle speed sensor which is connected to be rotated by said vehicle upon running of said vehicle to produce, for one rotation thereof, a number of pulses which is any one of several predetermined different numbers peculiar to available vehicle speed sensors which are prepared for the vehicle speed measuring method and some of which make a group wherein the numbers of pulses to be produced for one rotation have a greatest common divisor greater than 1, comprising the steps of:

discriminating whether or not said vehicle speed sensor connected to said vehicle belongs to said group;

frequency dividing, when said vehicle speed sensor belongs to said group, pulses from said vehicle speed sensor by a value obtained by division of a number of pulses produced for one rotation of said vehicle speed sensor by the greatest common divisor;

storing, each time a pulse obtained by such frequency division appears, time data indicative of the time of appearance of such pulse for at least one rotation of said vehicle speed sensor;

calculating, for each of the time data thus stored, a period for one rotation of said vehicle speed sensor in accordance with such time data and preceding time data which were stored when a pulse obtained by frequency division appeared precedently to the pulse by a number of pulse distances equal to the greatest common divisor; and calculating a speed of said vehicle in accordance with the period for one rotation of said vehicle speed sensor and a distance over which said vehicle runs for one rotation of said vehicle speed sensor.

2. A method as claimed in claim 1, wherein the vehicle speed sensors belonging to the group produce 4, 8 and 16 pulses for one rotation, and the greatest common divisor is 4.

3. A method as claimed in claim 1, wherein the vehicle speed sensors belonging to the group produce 10, 20 and 25 pulses for one rotation, and the greatest common divisor is 5.

4. A method of measuring a speed of a vehicle using a vehicle speed sensor which is connected to be rotated by said vehicle upon running of said vehicle to produce, for one rotation thereof, a number of pulses which is any one of several predetermined different numbers peculiar to available vehicle speed sensors which are prepared for the vehicle speed measuring method and which make two groups wherein the numbers of pulses to be produced for one rotation have greatest common divisors which are greater than 1 and different between said two groups, comprising the steps of:

discriminating to which one of said two groups said vehicle speed sensor connected to said vehicle belongs;
 frequency dividing pulses from said vehicle speed sensor by a value obtained by division of a number of pulses produced for one rotation of said vehicle speed sensor by the greatest common divisor of the one group to which said vehicle speed sensor belongs;
 storing, each time a pulse obtained by such frequency division appears, time data indicative of the time of appearance of such pulse for at least one rotation of said vehicle speed sensor;
 calculating, for each of the time data thus stored, a period for one rotation of said vehicle speed sensor in accordance with such time data and preceding time data which were stored when a pulse obtained by frequency division appeared precedently to the pulse by a number of pulse distances equal to the greatest common divisor; and
 calculating a speed of said vehicle in accordance with the period for one rotation of said vehicle speed sensor and a distance over which said vehicle runs for one rotation of said vehicle speed sensor.

5. A method as claimed in claim 4, wherein the vehicle speed sensors belonging to one of the two groups produce 4, 8 and 16 pulses for one rotation and the greatest common divisor is 4 while the vehicle speed sensors belonging to the other group produce 10, 20 and 25 pulses for one rotation and the greatest common divisor is 5.

6. An apparatus for measuring a speed of a vehicle using a vehicle speed sensor which is connected to be rotated by said vehicle upon running of said vehicle to produce, for one rotation thereof, a number of pulses which is any one of several predetermined different numbers peculiar to available vehicle speed sensors which are prepared for said vehicle speed measuring apparatus and some of which make a group wherein the numbers of pulses to be produced for one rotation have a greatest common divisor greater than 1, comprising:

discriminating means for discriminating whether or not said vehicle speed sensor connected to said vehicle belongs to said group;
 setting means for dividing, when said vehicle speed sensor belongs to said group, a number of pulses produced for one rotation of said vehicle speed sensor by the greatest common divisor to set a frequency dividing ratio;
 frequency dividing means for frequency dividing, when said vehicle speed sensor belongs to said group, pulses from said vehicle speed sensor by the frequency dividing ratio set by said setting means;
 storage means for storing, each time a pulse obtained by frequency division of said frequency dividing means appears, time data indicative of the time of appearance of such pulse for at least one rotation of said vehicle speed sensor;
 period calculating means for calculating a period for one rotation of said vehicle speed sensor in accordance with time data stored in said storage means; and
 vehicle speed calculating means for calculating a speed of said vehicle in accordance with the period calculated by said period calculating means and a distance over which said vehicle runs for one rotation of said vehicle speed sensor.

7. An apparatus as claimed in claim 6, wherein the vehicle speed sensors belonging to the group produce 4, 8 and 16 pulses for one rotation, and the greatest common divisor is 4.

8. An apparatus as claimed in claim 6, wherein the vehicle speed sensors belonging to the group produce 10, 20 and 25 pulses for one rotation, and the greatest common divisor is 5.

9. An apparatus as claimed in claim 6, wherein said period calculating means calculates, each time time data are stored into said storage means, a period for one rotation of said vehicle speed sensor in accordance with such time data and preceding time data which were stored when a pulse obtained by frequency division appeared precedently to the pulse by a number of pulse distances equal to the greatest common divisor.

10. An apparatus as claimed in claim 9, wherein said storage means is formed as a shift register of which contents are shifted when time data are stored into said storage means in response to a pulse obtained by frequency division of said frequency dividing means.

11. An apparatus for measuring a speed of a vehicle using a vehicle speed sensor which is connected to be rotated by said vehicle upon running of said vehicle to produce, for one rotation thereof, a number of pulses which is any one of several predetermined different numbers peculiar to available vehicle speed sensors which are prepared for said vehicle speed measuring apparatus and which make two groups wherein the numbers of pulses to be produced for one rotation have greatest common divisors which are greater than 1 and different between said two groups, comprising:

discriminating means for discriminating to which one of said two groups said vehicle speed sensor connected to said vehicle belongs;
 setting means for dividing a number of pulses produced for one rotation of said vehicle speed sensor by the greatest common divisor of the one group to which said vehicle speed sensor belongs to set a frequency dividing ratio;
 frequency dividing means for frequency dividing pulses from said vehicle speed sensor by the frequency dividing ratio set by said setting means;
 storage means for storing, each time a pulse obtained by frequency division of said frequency dividing means appears, time data indicative of the time of appearance of such pulse for at least one rotation of said vehicle speed sensor;
 period calculating means for calculating a period for one rotation of said vehicle speed sensor in accordance with time data stored in said storage means; and vehicle speed calculating means for calculating a speed of said vehicle in accordance with the period calculated by said period calculating means and a distance over which said vehicle runs for one rotation of said vehicle speed sensor.

12. An apparatus as claimed in claim 11, wherein the vehicle speed sensors belonging to the group produce 4, 8 and 16 pulses for one rotation, and the greatest common divisor is 4.

13. An apparatus as claimed in claim 11, wherein the vehicle speed sensors belonging to the group produce 10, 20 and 25 pulses for one rotation, and the greatest common divisor is 5.

14. An apparatus as claimed in claim 11, wherein said period calculating means calculates, each time time data are stored into said storage means, a period for one rotation of said vehicle speed sensor in accordance with such time data and preceding time data which were stored when a pulse obtained by frequency division appeared precedently to the pulse by a number of pulse distances equal to the greatest common divisor.

15. An apparatus as claimed in claim 14, wherein said storage means is formed as a shift register of which contents are shifted when time data are stored into said storage means in response to a pulse obtained by frequency division of said frequency dividing means.

* * * * *